(12) United States Patent
Padin

(10) Patent No.: US 7,324,337 B2
(45) Date of Patent: Jan. 29, 2008

(54) COMPACT RUGGED COMPUTER SYSTEM FOR MOBILE APPLICATIONS

(76) Inventor: Jeffry Padin, 136 Concord St., #206, El Segundo, CA (US) 90245

( * ) Notice: Subject to any disclaimer, the term of this patent is extended or adjusted under 35 U.S.C. 154(b) by 223 days.

(21) Appl. No.: 11/109,141

(22) Filed: Apr. 19, 2005

(65) Prior Publication Data
US 2005/0231905 A1    Oct. 20, 2005

Related U.S. Application Data

(60) Provisional application No. 60/562,912, filed on Apr. 19, 2004.

(51) Int. Cl.
*H05K 7/20* (2006.01)
(52) U.S. Cl. .................. 361/695; 361/685; 361/687
(58) Field of Classification Search .................. None
See application file for complete search history.

(56) References Cited
U.S. PATENT DOCUMENTS

| | | | |
|---|---|---|---|
| 6,272,011 B1 * | 8/2001 | Chen | 361/685 |
| 6,760,219 B2 * | 7/2004 | Hood et al. | 361/685 |
| 6,822,858 B2 * | 11/2004 | Allgeyer et al. | 361/685 |
| 6,967,833 B2 * | 11/2005 | Boykin et al. | 361/685 |
| 7,167,360 B2 * | 1/2007 | Inoue et al. | 361/685 |
| 2004/0032711 A1 * | 2/2004 | Kaczeus et al. | 361/685 |

\* cited by examiner

*Primary Examiner*—Boris Chérvinsky
(74) *Attorney, Agent, or Firm*—Michael Ries

(57) ABSTRACT

A mechanism and a method composed of a self-contained computer system device with mechanical vibration and shock absorbing capabilities. a closed, flexible, multi-legged device for isolation and suspension. The flexible legs support and isolate the closed volume from vibration and shock. Provided is protecting and cooling the system's electronics and disk drives. Also provided is isolating and dampening the electronics, CD and DVD assemblies from vibration and shock. It also provides mechanical support for the electronics assemblies and maintains the airflow through the assembly so that the internal temperature is close to room temperature. The removal of heat from the system internal electronics and the disk drive is achieved through forced convection heat transfer. The present invention dampens out shock and vibration as well as providing forced air-cooling of all the internal electronics.

14 Claims, 11 Drawing Sheets

COMPACT RUGGED COMPUTER SYSTEM FOR MOBILE APPLICATIONS

TECHNICAL FIELD & BACKGROUND

The present application claims priority on provisional patent application Ser. No. 60/562,912, to PADIN, filed on Apr. 19, 2004, entitled "COMPACT, RUGGED COMPUTER SYSTEM FOR VEHICLE APPLICATIONS", the contents of which are incorporated by reference herein.

The present invention generally relates to the field of mechanical devices designed to protect any electronic components or assemblies and disk drives from vibration, high G-shock or thermally adverse environments found inside moving vehicles. More specifically, the present invention will permit and allow normal operation in situations and conditions for which electronic elements and disk drives were not designed to properly operate.

There is a constant search to use electronic components designed for use in office or home environments, in more rugged environments such as in vehicles or any other mobile application, while avoiding damage that would by caused by the more rugged environments. Past attempts for supporting electronic elements and disk drives have not addressed all of the conditions that exist in these rugged environments. All of the conditions must be met to assure the proper functioning of electronic elements and disk drives inside vehicles.

A computer system is composed of several electronic components and assemblies. The electronic components and assemblies could be electronic assemblies, PCI cards, power supplies, routers, GPS receivers/transceivers, storage mediums, CD ROM and/or DVD ROM devices or any other appropriate electric or electro-mechanical device used in any mobile application. The storage medium could be a hard disk or floppy disk drive, CD ROM, DVD ROM, or any solid-state memory device. The most common storage medium used today is the hard disk or floppy disk drive. A disk drive is a device used to store and retrieve data from magnetic disk(s) spinning at high speeds. The hard disk drive system is composed of highly precision parts. The hard disk drive systems available today are designed to operate in office-like or home environments. The office-like environment is predominantly characterized by being non-vibrating and the temperature is maintained with heating and air-conditioning.

Electronic elements and disk drives must be protected from natural vibrations due to road conditions encountered inside vehicles. They also must be able to withstand high-impact shocks that occur when a vehicle is in an accident. Vehicle accidents need to be addressed, not as a frequent, but as likely occurrences. Additionally, another major disadvantage that can be associated with prior designs is volume constraints. Prior designs have addressed practical solutions with large volume enclosures that can meet some of the dynamic, spatial and thermal conditions encountered inside moving vehicles. A need therefore exists for a device, which permits current off-the-shelf electronic components and assemblies, standard drives, or any delicate device, to operate and meet all requirements under the hostile environments mentioned above, yet maintaining low volume requirements in vehicles.

SUMMARY OF THE INVENTION

This invention is a rugged computer apparatus capable of housing and isolating a DVD and/or CD ROM, computer electronics, hard drives, a power conditioning unit, a voltage regulator, a wireless card, an emergency power unit or other desired devices. The computer apparatus is capable of attenuating vibration and high-impact shocks encountered in moving vehicles. One or more self-restoring, flexible, shock-absorbing legs are provided to attenuate shock and vibration to the main casing and the hard drives. The system includes a vertical shelf for mounting and isolating the electronic assemblies and the DVD or CD ROM. The design also includes a Multi-Axis Hard Drive Isolation and Cooling Unit ("MAHICU"), which may include a hard disk tray.

The MAHICU unit also incorporates the self-restoring, flexible, shock-absorbing legs to attenuate shock and vibration. As a second layer to attenuate vibration, the MAHICU system suspends the hard drive in its tray using spring suspension. The hard drive tray serves as an apparatus for keeping the hard drive cable attached when the unit is subjected to high impact shocks. The disk drive tray is further isolated by keeping it from making contact with the protective walls of the enclosure. This feat is accomplished by suspending the tray, containing the hard drive, in mid air by the use of springs. The MAHICU unit is made of flexible material that further protects the hard drive by absorbing vibration and shock.

The advantages of using this computer isolation device are:

1. Ability to use off-the-shelf computer components in environments for which they were not designed.
2. Ability to incorporate a computer inside any type of moving vehicle including military and marine vehicles.
3. Potential for becoming a black-box recording device for vehicles.
4. Higher profits by using fewer materials than are needed in today's computer casings designed for vibration and shock.
5. Lower maintenance requirements.
6. Longer life of the computer system in harsh environments.
7. Backup systems for operations requiring rugged equipment.

Accordingly, it is the primary purpose of the invention herein to provide an advanced computer isolation system that would allow a computer to operate normally with off-the-shelf technology under high impact shock and vibration environments.

The invention also provides the means for efficiently cooling all components and assemblies contained in the enclosure.

The features and advantages of the invention herein will be readily apparent upon consideration of the following detailed description in conjunction with the accompanying drawings.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
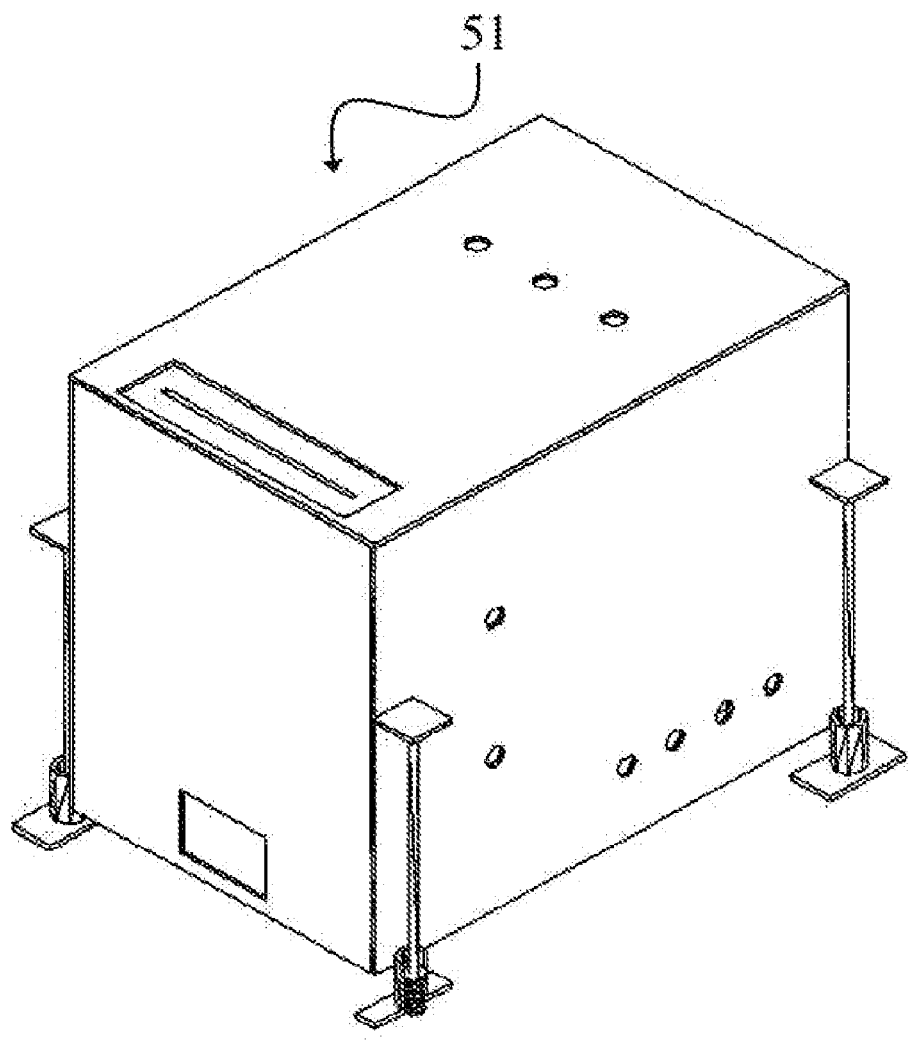
FIG. 1 illustrates a drawing of a compact rugged computer system for mobile applications, in accordance with one embodiment of the present invention.
Figure 2:
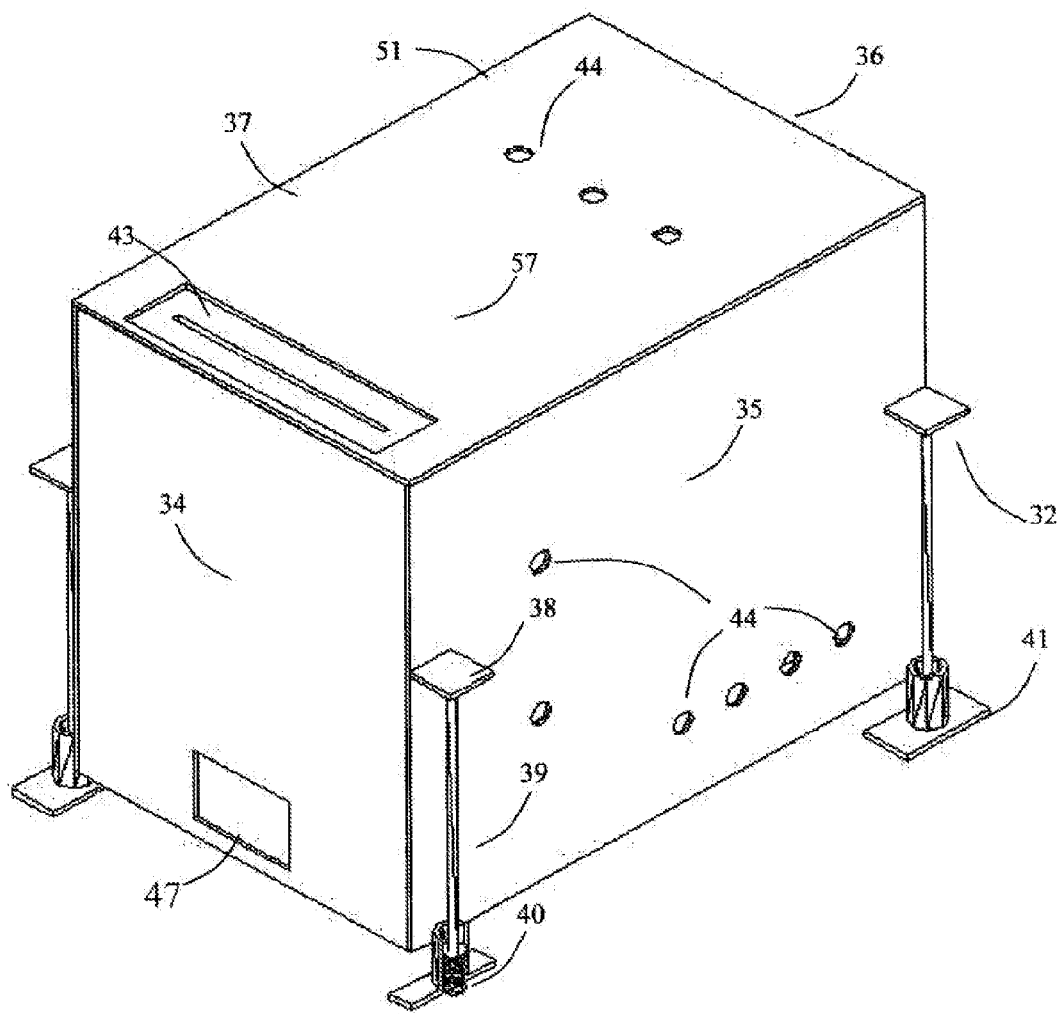
FIG. 2 illustrates a drawing of a perspective view of the flexible, multi-legged system casing, in accordance with one embodiment of the present invention.

This invention provides an apparatus that will minimize, reduce and mitigate the effects of induced external mechanical vibrations and high-impact shocks. Now referring to FIG. 1, as in one embodiment of the present invention shown is a main case 51. Referring to all the figures, in this invention, at least one electronics assembly 52, one DVD or CD-ROM 43, one hard disk drive 25, one power conversion unit 56, a back up power cell 54 and a power-conditioning unit 55. The suspension system functions to absorb physical and mechanical forces that are transmitted to the device from the environment in which it operates. The main case 51 is supported and isolated from vibrations by one or more self-restoring, flexible, shock-absorbing legs 39. The mitigation and absorption of energy in the form of vibration or mechanical shock by the suspension system can serve to isolate all the electronic components inside the main case 51. The system hard disk is further isolated by two additional independent suspension mechanisms. These are the MAHICU unit 50 and the hard disk tray 27 with spring isolation system 22.

In the subsequent discussion, we refer to the "main case 51" as the box-like apparatus that holds all of the electronic components. We also refer to the MAHICU device 50 as the apparatus that contains the hard drive unit 25 and the hard drive tray 27 with the energy absorbing elements 22. Furthermore, although the invention will be described below with respect to a particular configuration, namely one electronics assembly 52, one DVD or CD ROM 43, one hard disk drive 25, one power conversion unit 56, a back-up power cell 54 and a power conditioning unit 55, it is understood that the invention can apply to any system with several electronic components other than the ones mentioned above, which would be required to operate under harsh, rugged, high-shock, high vibrations or rough conditions. We also refer to hard disk drive 25 as an apparatus used to store data, including solid-state memory, DVD, cassettes or any magnetic memory device.

Figure 3:
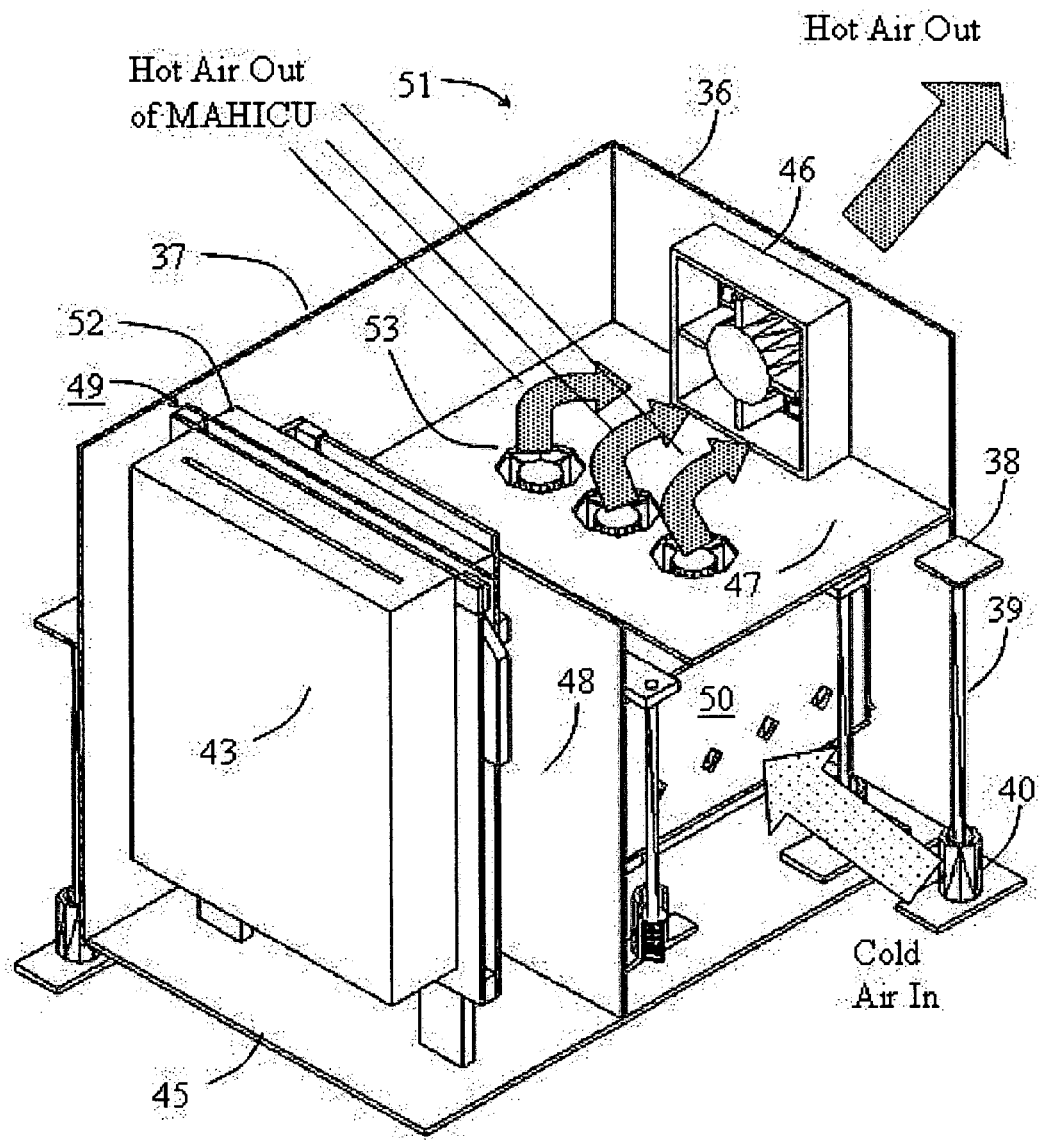
FIG. 3 illustrates a drawing of a perspective, cutaway view that shows the DVD or CD ROM and the MAHICU hard drive isolation system showing the path for conditioning airflow in accordance with one embodiment of the present invention.

Turning to FIG. 3, a front isometric view is depicted of the device main case 51 in accordance with one embodiment of the present invention. The main case 51 is in the shape of a box to provide protection and support to several components not shown in this drawing, it is understood that the case 51 could be any appropriate shape. The shown main case 51 is enclosed on all sides by six panels. Thus, when we refer to the main case 51 as being enclosed or as an enclosure we mean that the main case 51 is generally configured as depicted in the accompanying Figures, wherein the chassis forms a substantially closed outer protective shell on legs or the like. All six panels are made of energy absorbing material. Four of the panels enclosed the case laterally (34, 35, 36, 37) and two others make the top 57 and floor panels 45. There are several circular vents 44 available for cooling purposes strategically located on the main case 51. The main case 51 includes but is not limited to four flexible, self-restoring legs 39. The self-restoring legs 39 are attached to the case by a clamp 38. Each leg 39 has a shock-absorbing unit at its base 40. Each clamp 38 has a self-restoring joint 32. The shock-absorbing unit in each leg is composed of the casing 41 and a shock absorbing material, which could include but not limited to springs. The main case 51 also has a CD/DVD slot on located on the top panel 57. There is also a cable slot 47 located on the front panel 34. This cable slot 47 serves as a conduit for data and/or power cables.

Shown is a cut away isometric view of the main case 51. The inside of the main case 51 has three separated areas as discussed below. As is evident, the entire interior of the main case 51 is visible with all of its major components. The first major component shown is the DVD/CD ROM 43. This component is located in the first isolated area located in the front of the main case 51. The DVD/CD ROM 43 is shown attached to electronics assembly tray 49. The DVD/CD ROM 43 is set in a vertical position at a right angle to the floor panel 45. On the opposite side of the electronics assembly tray 49 is the system's electronics assembly 52. As shown, the electronics assembly 52 is position vertically in the main case 51 at a right angle to the floor panel 45. The second region, inside the main case 51, houses the system fan 46 and some electronics not shown. The fan floor panel 53 bounds the second region. This panel 53 contains three main vents to allow for hot air to be exhausted from the MAHICU component 50, which is located on the third enclosed region. The hot air travels through the holes of the fan floor panel 53 and is vented out of the system by the main case fan 46. The third enclosed region is located directly under the fan floor panel 53 which is occupied by the MAHICU component 50 as well as the back up power cells 54 and the power conditioning unit 55. The drawing shows the flow of circulating air as cold air flows through the MAHICU intake vents 14 out to the fan vents on the fan floor panel 53 and out of the main case 51 through the system fan 46.

A close examination of FIG. 3 reveals that the main case 51 is separated into three distinctive sections. The main case front panel 34 and the electronics assembly separation panel 48 enclose the first section. The DVD or CD ROM 43 and the system electronics assembly 52 occupy the first section. The main case top panel 57 and the fan floor panel 47 enclose the second section. The system fan 46 and system power supply 56 occupy the second section. The electronics assembly separation panel 48, the fan floor panel 47, the main case back panel 36 and the main case floor panel 45 enclose the third section. The MAHICU component 50, power cells 54, and power conditioning unit 55 occupy the third section. The power conditioning unit 55 is a 12 Volt USB DC-DC power regulating and conditioning system that regulates the input voltage coming from the vehicle to the system and outputs 12 volts as well as voltage information on the system. The USB 12 Volt DC-DC power regulation and conditioning unit has the capability to switch to an alternate power source in order for continuing system operation for a limited time.

Figure 4:
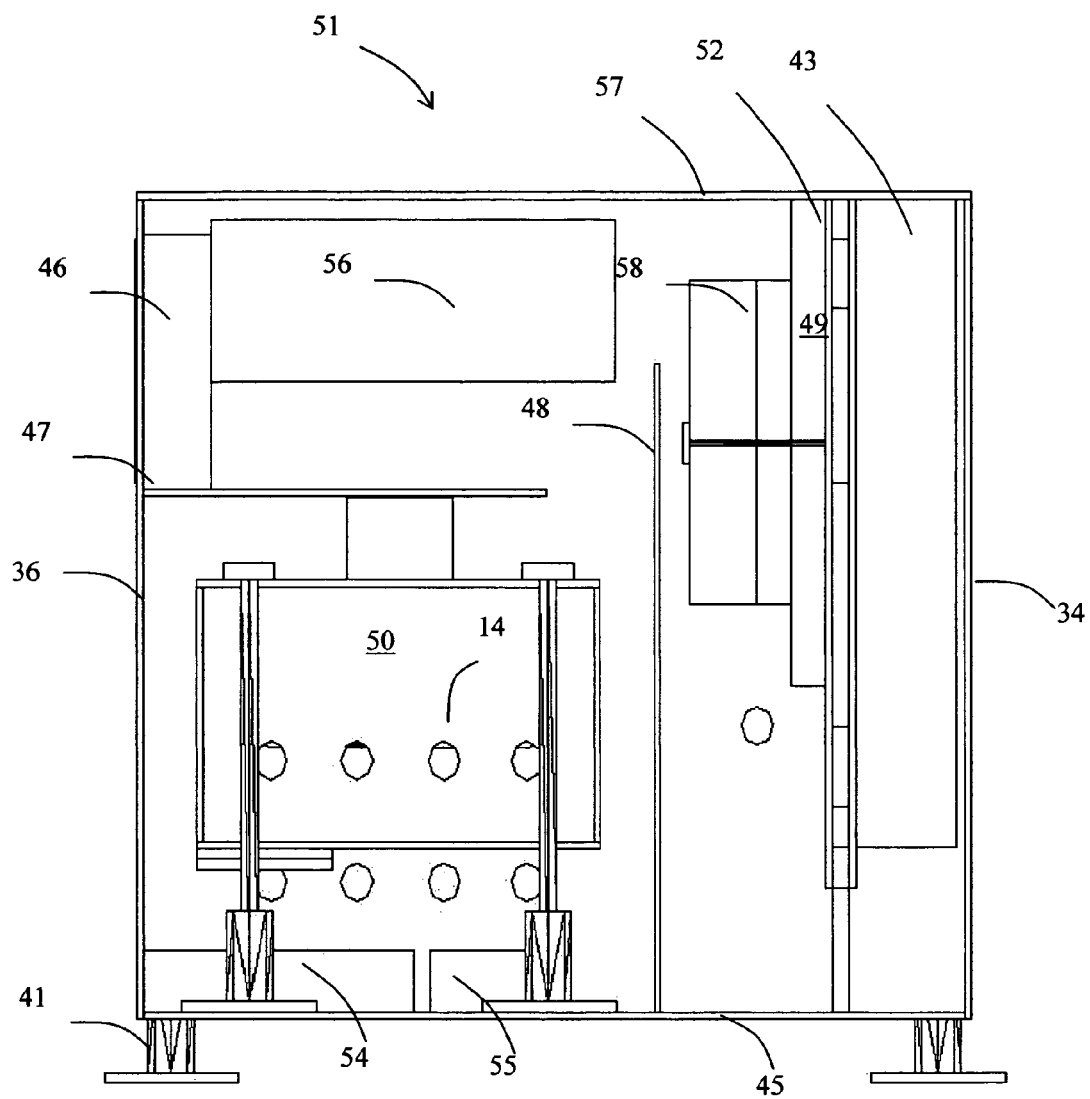
FIG. 4 illustrates a drawing of a cutaway side view of the main system casing, in accordance with one embodiment of the present invention.

Turning to FIG. 4, a side cut away view is shown of the main casing 51. As is seen, all major components are visible. The DVD/CD ROM 43, the system electronics assembly 52, the system riser card 58, the electronics assembly tray 49, the system fan 46, the system power supply 56, the MAHICU component 50, the back-up power cells 54, the power conditioning unit 55, the fan floor panel 53 and the electronics assembly separation panel 48.

Figure 5A:
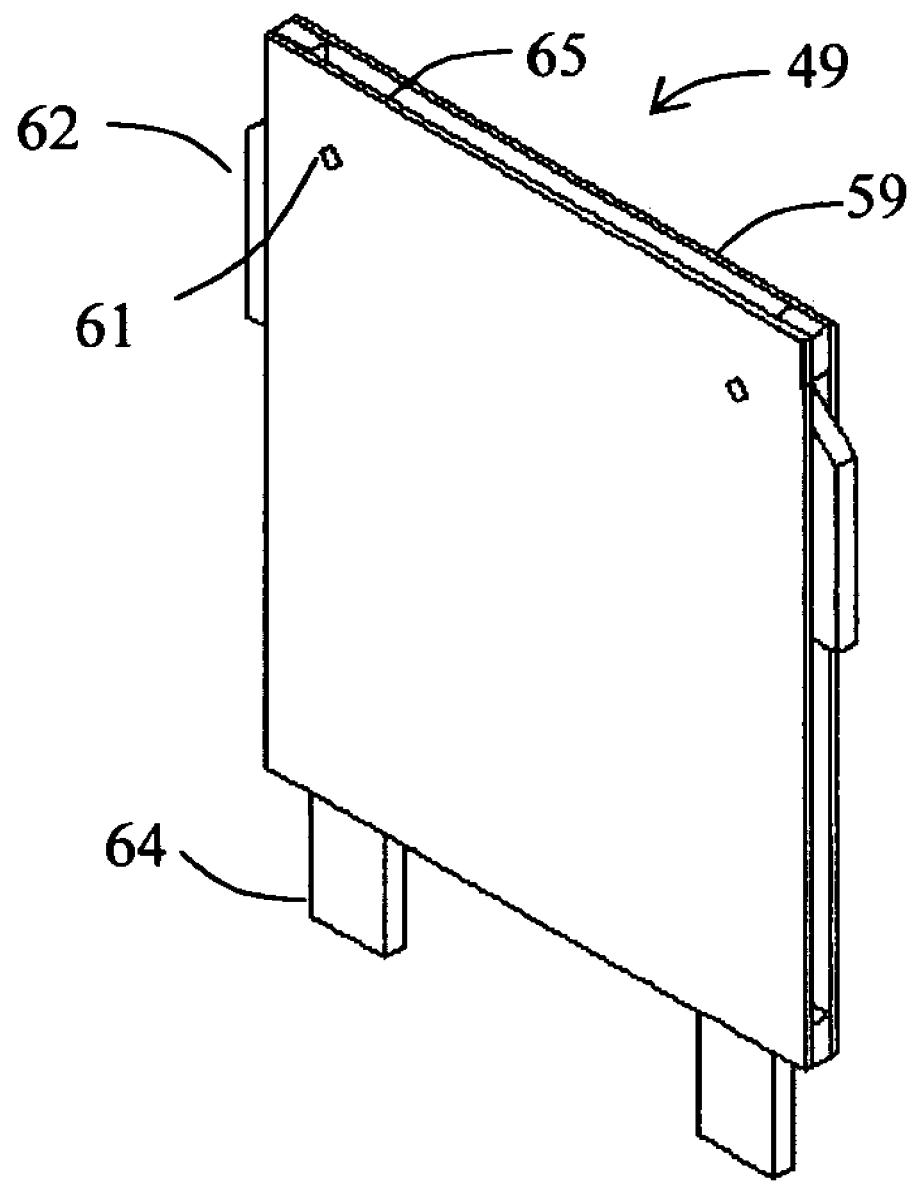
FIG. 5A illustrates an a perspective view of the DVD or CD ROM/electronics vertical shelf, in accordance with one embodiment of the present invention.
Figure 5B:
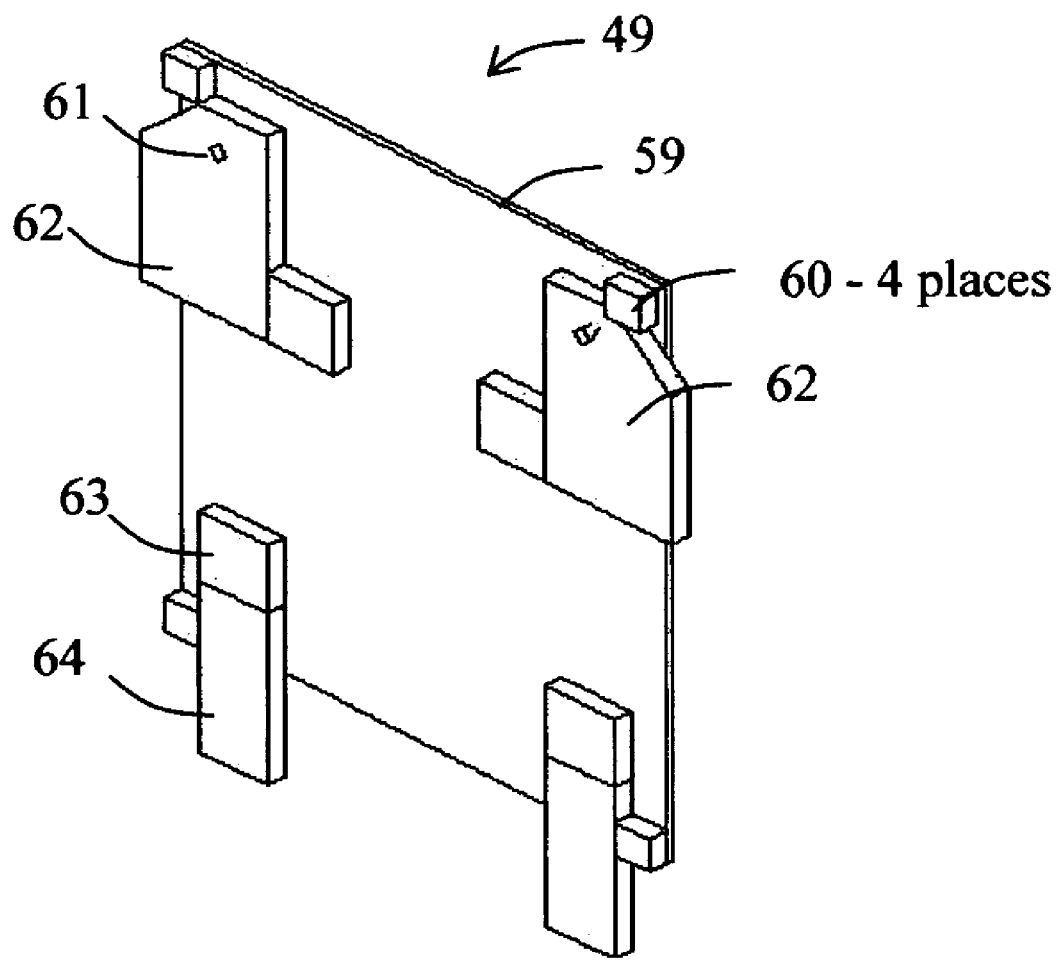
FIG. 5B illustrates an a perspective, cutaway view of the DVD or CD ROM/electronics vertical shelf, in accordance with one embodiment of the present invention.
Figure 5C:
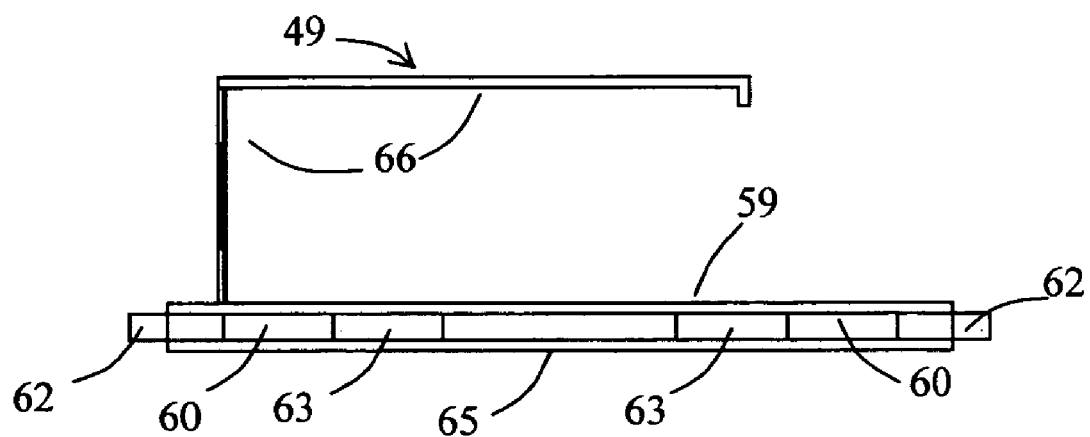
FIG. 5C illustrates an a perspective, top view of the DVD or CD ROM/electronics vertical shelf, in accordance with one embodiment of the present invention.

FIGS. 5A and 5B show two isometric views of the electronics assembly tray component 49. The electronics assembly tray component 49 holds the DVD/CD ROM unit 43 on one side and the system electronics assembly 52 on the other side. Both components are fixed in a vertical position. The electronics assembly tray 49 has an internal shock and vibration absorbing system. It is made of the tray flaps 62, tray legs 64 and flap breaks 63. A close examination of FIG. 5B shows that there are two tray flaps 62 hinged 61 between the front electronics assembly tray panel 59 and the back electronics assembly tray panel 65. The tray flaps 62 absorb vibration and shock energy through the flap breaks 63. The flap break 63 is a shock-absorbing device and is positioned in the lower backside of the tray flap 62. The flap break 63 could be a device made of energy absorbing material or could be a spring. Two electronics assembly tray legs 64 support the whole assembly. The electronics assembly tray legs 64 can isolate vibrations and shocks by using flap breaks 63 placed at the top part of the legs 64. All the main components of the electronics assembly tray's internal shock and vibration isolation are sandwich between the tray's front 59 and back panel 65 and held together by the electronics assembly tray spacers 60. FIG. 5C shows a top view of the electronics assembly tray 49. In this view, it is possible to see the high-impact riser cardholder 66. This item is part of the electronics assembly tray 49 and it serves the purpose of securing the riser card 58 to the system electronics assembly 52.

Figure 6:
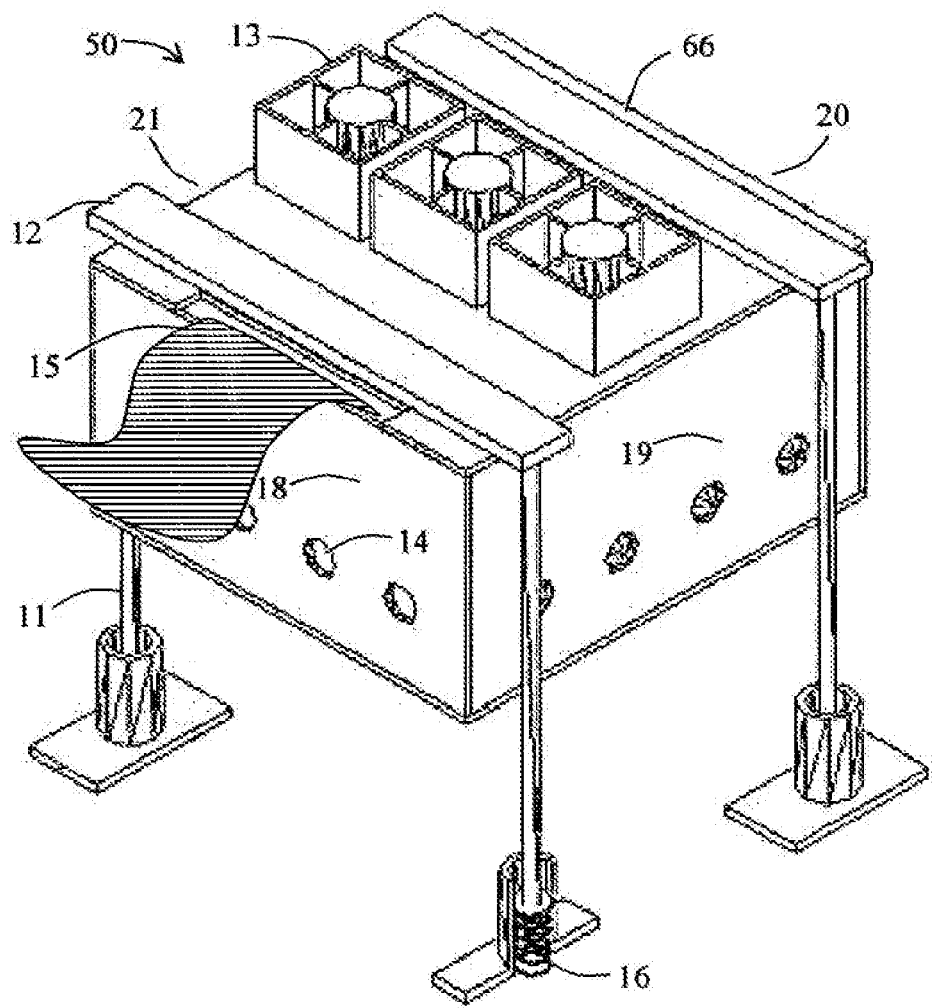
FIG. 6 illustrates a drawing perspective view of the MAHICU hard drive isolation unit, in accordance with one embodiment of the present invention.
Figure 9:
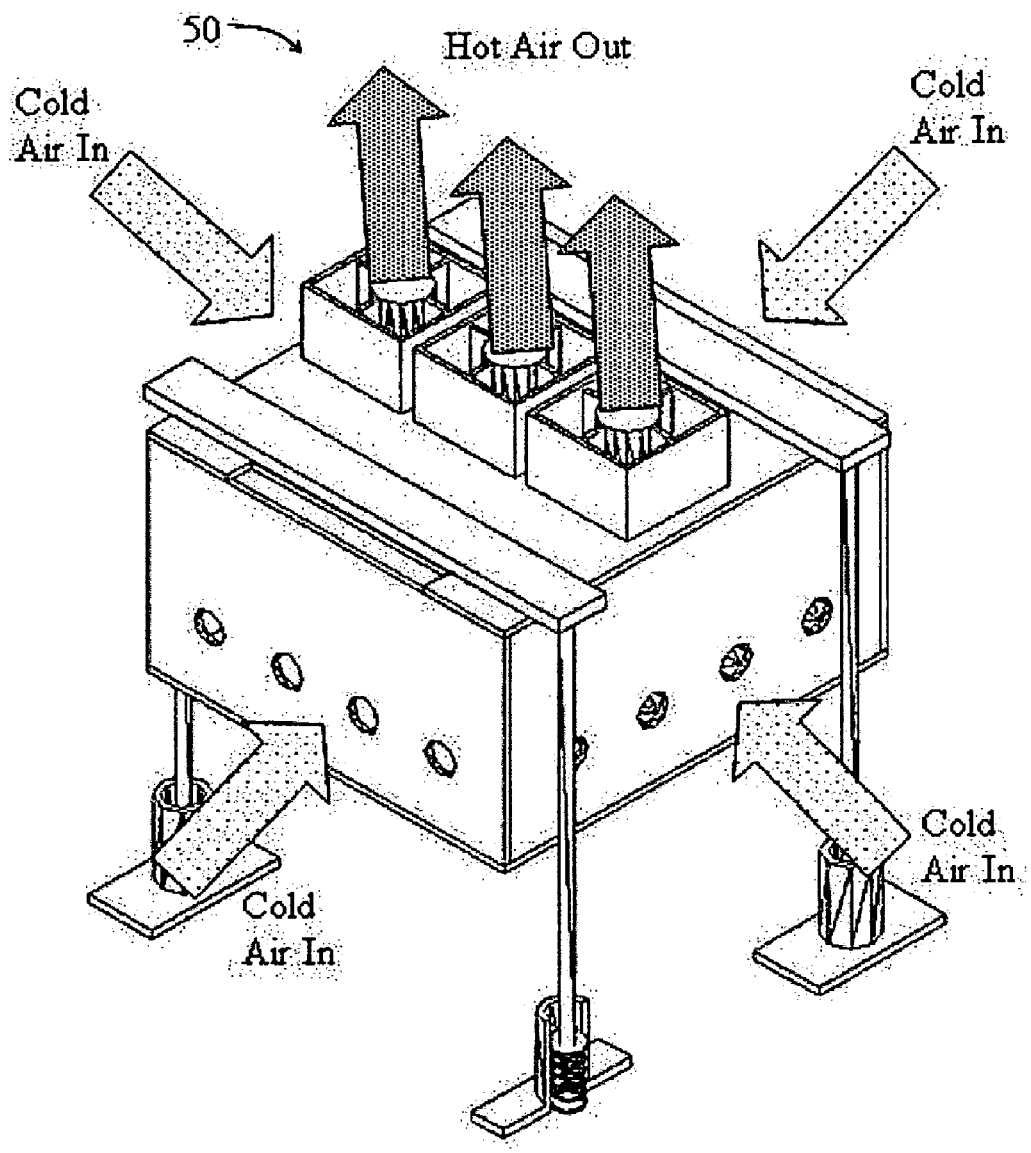
FIG. 9 illustrates a drawing of a semi schematic perspective view of the MAHICU unit illustrating the airflow cooling paths, in accordance with one embodiment of the present invention.

Moving now to FIG. 6, an isometric view of the MAHICU (Multi-Axis Hard Drive Isolation and Cooling Unit) component 50 is shown. The MAHICU component 50 is an enclosure that contains the system's hard drive 25. The enclosure is made of six panels that make the floor 28, top 66 and sides of it (18, 19, 20, 21). The MAHICU component 50 is supported but not limited to four self-restoring, shock isolating legs 11. The design of the self-restoring shock absorbing legs 11 is similar to the legs 40 used to support the main case 51. The leg design 40 is described in detail above. The six panels (28, 66, 18, 19, 20, 21) that house the MAHICU component 50 are made of shock absorbing material. Three fans 13 located on the top MAHICU panel 66 cool the hard disk drive 25. The MAHICU shock absorbing legs 11 are attached to the braces 12, which in turn are attached to the top panel 66. The side panels (18, 19, 20, 21) have ports 14, which are used to force cold air into the MAHICU component 50 to cool the system's hard drive 25. The warm air is removed from the MAHICU component 50 by the three fans 13 as shown on FIG. 9. The hard disk drive cable 15 is run through a slot on the top MAHICU panel 66.

Figure 7:
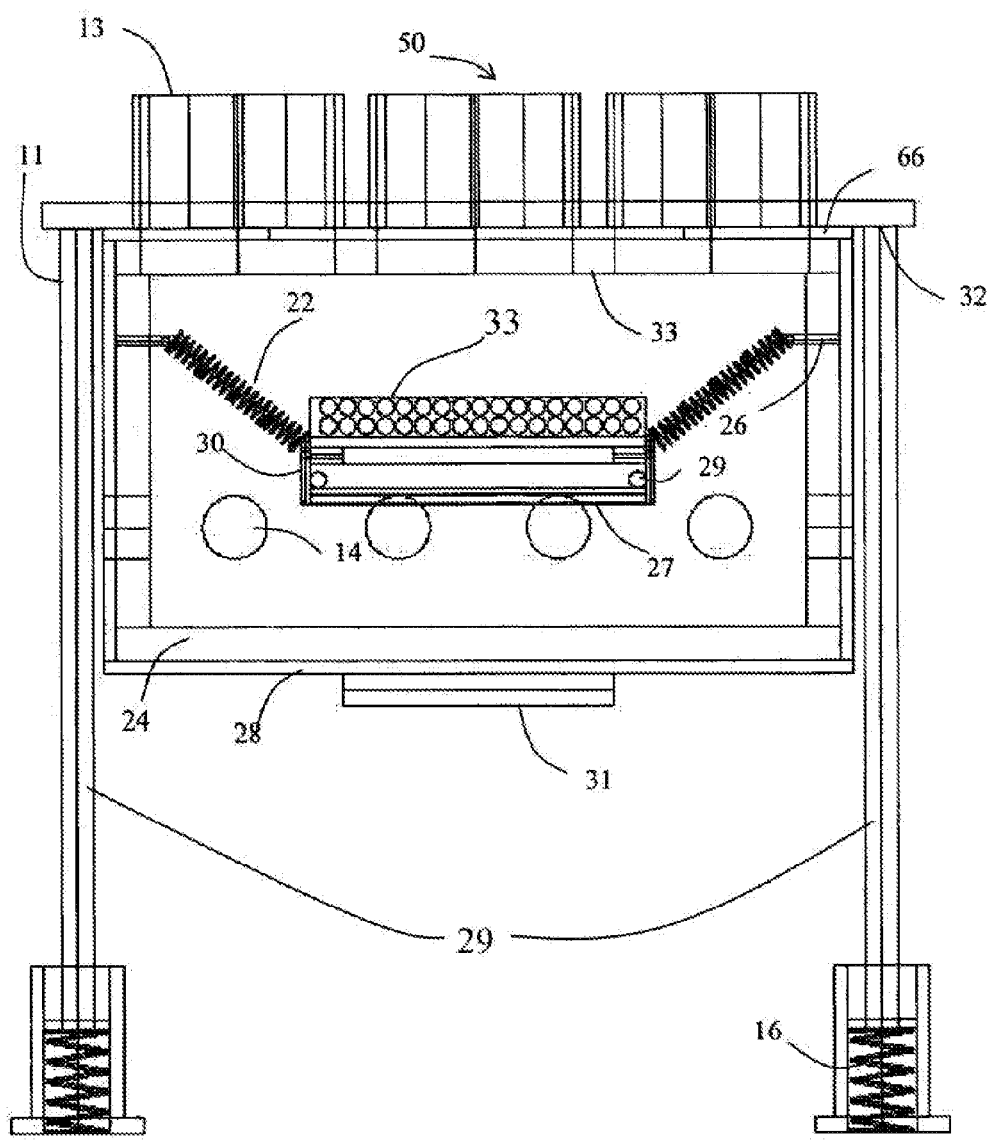
FIG. 7 illustrates a drawing of a front view of the MAHICU hard drive isolation unit, in accordance with one embodiment of the present invention.
Figure 8:
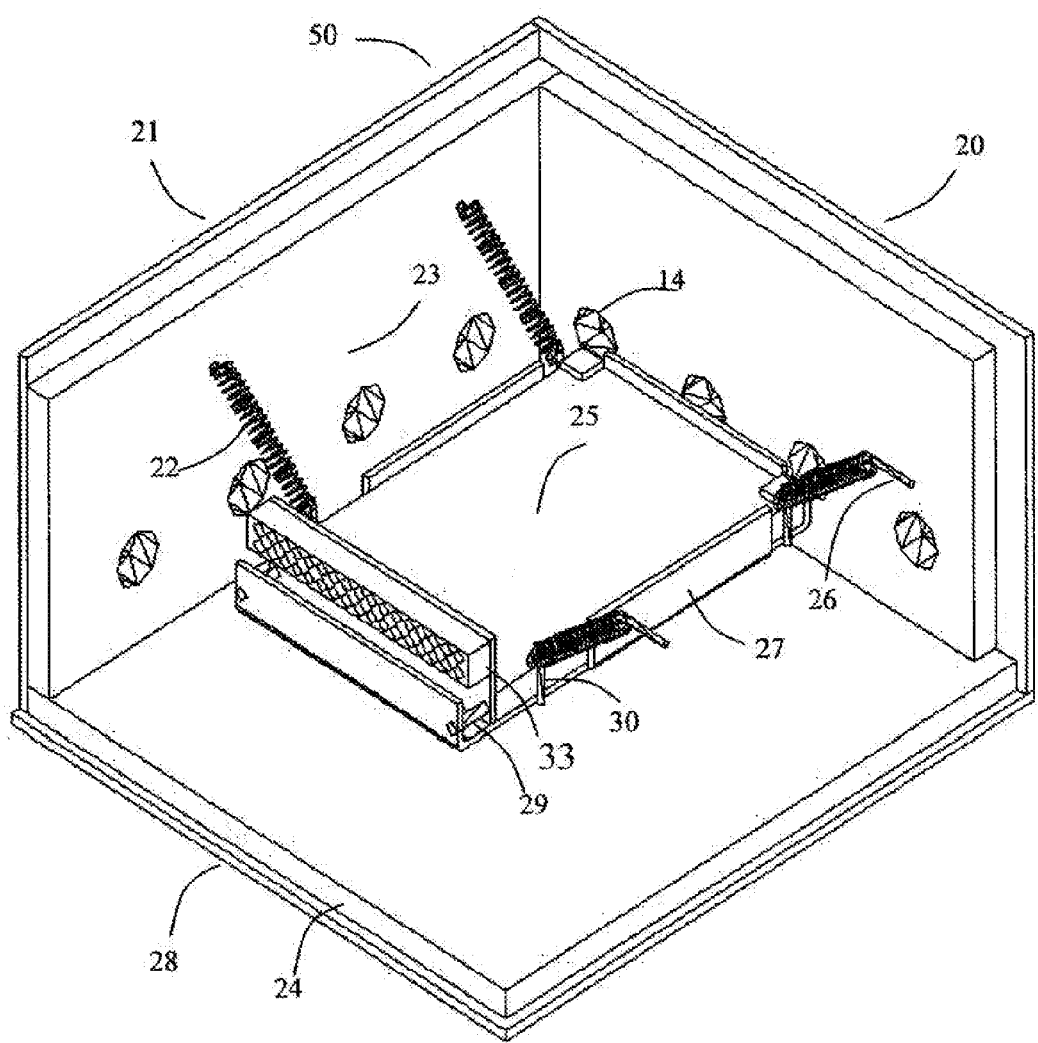
FIG. 8 illustrates a drawing of a perspective, cutaway view of the hard drive tray, in accordance with one embodiment of the present invention.

FIG. 7 shows a front view of the MAHICU component 50. As seen in this view, the system hard drive 25 is inside a hard drive tray 27. The hard drive tray 27 protects the integrity of the connection between the IDE adapter 33 and the hard drive 25 under high-impact shocks and vibrations. The hard drive tray 27 is further isolated from vibrations and shocks by being suspended from four springs 22. The inside of the MAHICU component is covered with cushioning material 24. A damping weight 31 is also seen attached to the MAHICU bottom panel 28. MAHICU shock-absorbing legs 29 are shown. FIG. 8 shows a cut away isometric view of the MAHICU component 50 showing the hard drive tray 27, the IDE adapter 33, the system hard drive 25, the springs 22 and the cushioning 24 inside the MAHICU.

While the present invention has been related in terms of the foregoing embodiments, those skilled in the art will recognize that the invention is not limited to the embodiments depicted. The present invention can be practiced with modification and alteration within the spirit and scope of the appended claims. Thus, the description is to be regarded as illustrative instead of restrictive on the present invention.

What is claimed is:

1. An apparatus comprising:
 a plurality of main case shock absorbing legs that self restore a shock;
 at least one first fan inside the first plurality of legs;
 at least one electronics tray mounted vertically to the first plurality of legs;
 a plurality of MAHICU shock-absorbing legs to support at least one hard drive;
 at least one second fan to cool the at least one hard drive; and
 at least one back-up power cell and power conditioning system.

2. The apparatus of claim 1, wherein the electronics tray has absorption shocks.

3. The apparatus of claim 1, wherein a multi-axis isolation and cooling unit is supported by a self-restoring, shock absorbing leg system including a hard drive tray that is suspended by springs.

4. The apparatus of claim 1, wherein a hard drive high-shock impact vibration absorption tray is used to support the at least one hard drive.

5. A main case in a vehicle to enclose computer hardware and protect the computer hardware from impact comprising:
- a plurality of first legs that self restore a shock and the computer hardware is a common off the shelf designed for home environments;
- at least one first fan inside the first plurality of legs;
- at least one electronics tray mounted vertically to the first plurality of legs and the electronics tray absorbs shocks;
- a plurality of second legs to support at least one hard drive;
- at least one second fan to cool the at least one hard drive; and
- at least one back-up power cell and power conditioning system comprising; a 12 volt DC-DC power regulator having USB capabilities.

6. The case of claim 5, wherein a multi-axis isolation and cooling unit is supported by a self-restoring, shock absorbing leg system including a hard drive tray that is suspended by springs.

7. The case of claim 5, wherein a hard drive high-shock impact vibration absorption tray is used to support the at least one hard drive.

8. A method comprising:
- restoring a shock for a plurality of first legs, the plurality of first legs having at least one first fan inside;
- mounting vertically to the plurality of first legs at least one electronics tray;
- supporting at least one hard drive with a plurality of second legs;
- cooling the at least one hard drive with at least one second fan; and
- powering the at least one hard drive by at least one back-up power cell and power conditioning system.

9. The method of claim 8, wherein the electronics tray has absorption shocks.

10. The method of claim 8, wherein a multi-axis isolation and cooling unit is supported by a self-restoring, shock absorbing leg system including a hard drive tray that is suspended by springs.

11. The method of claim 8, wherein a hard drive high-shock impact vibration absorption tray is used to support the at least one hard drive.

12. A method for protecting computer hardware from an impact comprising:
- restoring a shock for a plurality of first legs, the plurality of first legs having at least one first fan inside and the computer hardware is common off the shelf designed for home environments;
- mounting vertically to the plurality of first legs at least one electronics tray;
- supporting at least one hard drive with a plurality of second legs;
- cooling the at least one hard drive with at least one second fan; and
- powering the at least one hard drive by at least one back-up power cell and power conditioning system.

13. The method of claim 12, wherein a multi-axis isolation and cooling unit is supported by a self-restoring, shock absorbing leg system including a hard drive tray that is suspended by springs.

14. The method of claim 12, wherein a hard drive high-shock impact vibration absorption tray is used to support the at least one hard drive.

* * * * *